Patented Mar. 28, 1944

2,345,113

UNITED STATES PATENT OFFICE 2,345,113

PROCESS OF PRODUCING BUTADIENE

Herbert Guggemos and Alfred Treibs, Munich, Germany; vested in the Alien Property Custodian No Drawing. Application August 10, 1940, Serial No. 352,072. In Germany August 26, 1939

16 Claims. (Cl. 260—681)

The object of this invention is the manufacture of butadiene by thermal decomposition of the diesters of the butylene glycols which contain at least one carbon atom free of hydroxyl groups between the hydroxylated carbon atoms. A special object of the invention is the thermal decomposition of the 1,3-butylene glycol and the 1,4-butylene glycol.

As is well known (Zentralblatt 1916, I, page 781) the esters of the 1,3-butylene glycol can be decomposed—under the catalytic influence of special substances at 280° C. to 500° C.—into butadiene and the corresponding acid, and also into the decomposition products of these. Because the 1,3-butylene glycol, nowadays the most suitable starting material for the production of ester, is decomposed into butadiene and water under similar conditions and thus as the decomposition of ester includes an additional step and the circulation of a further substance, this process is of no technical importance. Such importance would have been realized only if by the increased expense of material and work corresponding advantages would have been obtained. The yield, however, is only 70%.

Now we have found simple measures causing a great superiority of the ester decomposition. Today by the best processes for the decomposition of 1,3-butylene glycol a moderate yield, that is a "space-time" yield of scarcely 50 g. of butadiene per liter reaction space and per hour is obtained, whereby the working capability of the equipment is very unsatisfactory because of the low durability of the catalysts (compare German Patent No. 601,224). By the practice of the present invention, however, a more than a twentyfold "space-time" yield is obtained, the butadiene obtained, being of an unsurpassable purity of above 99.5% and the working capability of the equipment is of practical durability. The yields are nearly 100% of the theoretical both with respect to the butadiene as well as with respect to the acid. This unexpected improvement of the known decomposition of ester is obtained by employing decomposition temperatures above 500° C.—whereby catalysts are not necessary—and by the simultaneous use of diesters esterified to 100% or nearly 100%, that is of esters free or nearly free of unesterified or only partly esterified glycol. Equally noteworthy are the working characteristics, the yield, and the purity of the butadiene, if the esters of the 1,4-butylene glycol are decomposed under the same conditions of decomposition, the same precautions with regard to the quality of the starting material being observed. The decomposition temperature is chosen as high as possible in order to get a high working capacity. The temperature is limited by the required purity of the butadiene which is reduced at too high temperatures. Especially suitable is a temperature of about 600° C. At this temperature the use of catalyst is omitted. The most suitable temperature in particular depends somewhat upon the monocarboxylic acid employed. Generally the most suitable temperature is between 550° and 650° C. Suitable acids are a great number of monocarboxylic acids, for example, acetic acid, propionic acid, butyric acid, benzoic acid. As a rule the cheapest of the available acids is acetic acid which is also especially suitable for the execution of the process. It is surprising how easily acetic acid can be esterified with 1,3-butylene glycol. The reaction between the components proceeds rapidly after a short period of heating without the use of a special catalyst for the esterification. The water produced during the esterification should be distiled off. For facilitation of the distillation an azeotropic distillation may be employed, for example, with the aid of benzene. The remaining raw ester need not be produced in a pure state; it is only necessary to drive the esterification so far that about 96% of the glycols is present in the form of diesters. The control may be carried out in the known way by the determination of the content of the ester. If necessary, acid may be added once more and then a further esterification may be executed. The nearly total esterification of the glycol is essential for the success of the process in accordance with the present invention, for surprisingly the yield of the decomposition and the purity of the butadiene obtained are evidently reduced, if a diester is employed the glycol of which is only esterified to 96%. The disadvantages of the use of a glycol which is only partly esterified are especially evident, if monoester is decomposed. Thus, for example, monoacetate of the 1,3-butylene glycol when thermally decomposed yields not even 50% of butadiene according to the theory, and the purity of the butadiene is only 70–98% according to the grade of esterification. However, with diesters completely free from glycol, butadiene of a purity of more than 99.5% is obtained in a yield of more than 96% of the theory. The decomposition velocity of the diester is extremely high, amounting to 500 g. of butadiene and more per liter reaction space and per hour. Thus, it is, for example, according to Table 1 in the first experiment 1100 g. per liter an hour. The greatest decomposition velocity is obtained if the ester is very quickly driven through and only partly converted. Working in this way, the butadiene can be easily kept in its highest purity. The constituents which have not been converted are—with or without being separated from the decomposition acid and with or without an addition of fresh diesters—again subjected to the decomposition treatment. Usually the decomposition acid contains unsaturated esters formed by only 1 mol. of acid splitting off from the diester. After having been driven once more through the decomposition tube they are also decomposed into butadiene and acetic acid. The decomposition acid is suitably employed for the esterification of fresh glycol. Thereby the separation of the non-converted diester or of the just mentioned unsaturated esters is not necessary. It is also possible to keep the decomposition velocity so low, that even by a single passage a nearly quantitive decomposition of the ester is obtained. Thereby the purest butadiene is produced by using subatmospheric pressure or by adding inert gases or vapors such as, for example, nitrogen or acetic acid.

If the esterification is 100% the best decomposition results are obtained, but even when the grade of esterification is nearly 100% very good results are still obtained. The results are, however, substantially reduced, if the glycol esters contain somewhat greater amounts of unesterified or partly esterified glycols. The suitable grades of esterification can be seen exactly in the tables given in the Examples 3 and 4. This renders it possible to facilitate the esterification and to render the process more economical, for, even though the esterification must be nearly complete, it is not necessary to execute the esterification quantitatively in order to obtain excellent results from the decomposition of the esterified product in accordance with the present invention.

As the process in accordance with the present invention employs an ester of butylene glycol instead of butylene glycol, an additional step, namely, the esterification of the glycol is necessary. This additional step, however, renders it possible to obtain a high working capacity as well as a high yield of butadiene of high purity. The esterification must be carried out as economically as possible and may be obtained merely by boiling the reaction components and distilling off the water produced during the reaction. Because of the known difficulties in separating acetic acid from water and because, as is well known, the esterification reaction equilibrium only proceeds to completion very slowly, a distillate is obtained at the end of the esterification which is relatively rich in acetic acid. In view of the results obtained in accordance with the present invention, an esterification which is somewhat below 100% complete is sufficient to obtain good results, so that the step of esterification is facilitated. This effects a substantial saving in time, heat, and acetic acid. While a somewhat lower conversion is obtained when the esterification is not quite complete, this is compensated because of the practical advantages which may be obtained as long as the ester decomposed in accordance with the present invention contains no more than 4% of free hydroxyl groups.

Esters obtained with other acids react similarly. The amount of non-esterified or incompletely esterified glycol contained in the esterification product employed is decisive.

The decomposition may also be executed in the presence of inert gases or vapors. It has been unexpectedly found, in accordance with the present invention, that the decomposition is not hindered by the presence of vapors of the acetic acid and other carboxylic acids, and that it is also not injured by the presence of free water. It is possible, therefore, to employ the raw esterification mixture consisting chiefly of butylene glycol diacetate and containing an excess of acetic acid for the decomposition. Furthermore, it is possible to wash the butadiene with butylene glycol diacetate after freeing it from the chief quantity of acetic acid and from the constituents of esters by condensation, whereby the last constituents of ester and acetic acid are washed out. The washing fluid which contains acid may then be decomposed without a regeneration treatment.

The reaction may be executed at atmospheric pressure but also at reduced or increased pressure.

It has been found necessary to adjust the temperature and rate of passage employed with respect to the grade of the esterification product which is employed in order that the best capacity which is possible and in order that butadiene of good purity be obtained. The most suited temperature and rate of passage is easily ascertained by experimenting. By regulating the rate of passage of the ester through the conversion chamber to a low value a very high conversion is obtained, but the purity of the butadiene obtained is reduced. If butadiene of especially high purity is desired, the amount of conversion must be reduced. This may be done by regulating the rate of passage of the ester through the conversion chamber and by regulating the heating of such chamber. The working capacity of the method of decomposition is not to be limited by the mentioned rate of passage and degree of conversion.

The esters of the two glycols 1,3-butylene glycol and 1,4-butylene glycol react similarly. However, in some respects they differ very evidently from one another. The decomposition of the 1,4-derivatives is suitably executed at somewhat higher temperatures than those employed for the decomposition of the 1,3-derivatives.

EXAMPLE 1

Through a tube heated to 600° C. consisting of steel resistant to acid, for example, Sicromal 12, with a diameter of 22 mm. in the inside and a length of 500 mm., 500 g. of 1,3-butylene glycol diacetate are passed per hour. The reaction gases are fractionated by cooling them down in order to eliminate the acetic acid and the non or only partly converted ester. The gaseous butadiene is washed in a suitable manner with glycol diacetate and finally with some alkali in order to separate the small quantities of acetic acid remaining therein. After the first passage 131 g. of butadiene of a purity of more than 96% are obtained from 500 g. of 1,3-butylene glycol diacetate. This corresponds to a working capacity of 690 g. of butadiene per liter reaction space and hour. The condensate, after having been freed from butadiene yields after a repeated passage under the same conditions 17 g. of butadiene of the same grade of purity. This corresponds to a total yield of more than 95% of the theory. The acetic acid is regained with a yield of more than 98% of the theoretical.

EXAMPLE 2

Through an empty tube consisting of quartz heated to about 600° C., of 30 mm. diameter and a length of 500 mm., 100 g. of 1,3-butylene glycol diacetate are passed per hour in the form of a vapor at a pressure of 110 mm. of mercury. The acetic acid, which is split off, is eliminated by a water cooler, the butadiene is condensed in a receiver which is cooled to a low temperature. The butadiene dissolved in the condensate of acetic acid is obtained by boiling out. Finally the whole butadiene is vaporized once more in order to eliminate small quantities of acetic acid; thereafter the vapors are washed in alkali. The purity of the thus obtained butadiene lies over 99.8%, and already after one passage, the yield is above 96% of the theoretical. The acetic acid is regained nearly quantitatively as in Example 1.

The diacetate of the 1,3-butylene glycol is produced, for example, as follows: 1 mol of the 1,3-butylene glycol is boiled with 4 mols of acetic acid; with the aid of a column, the water of the esterification is distilled off in the form of dilute acetic acid. The esterification is finished when pure glacial acid is distilled over.

In a similar manner the di-propionate or the di-butyrate of the glycol may be obtained and decomposed into butadiene.

The diacetate of 1,4-butylene glycol may be obtained in the same manner as the diacetate of 1,3-butylene glycol and reacts similarly upon decomposition.

EXAMPLE 3

The comparative experiments of the decomposition of the 1,3-butylene glycol of different esterification grades described in the tables were executed as in Examples 1 and 2.

1000 g. of the particular 1,3-butylene glycol esterification product containing a greater or lesser quantity of by-products, were passed at 600° C. through a decomposition tube of 250 cubic centimeter content per hour. The conversion stated in the table is with reference to the constituent completely decomposed into butadiene and acetic acid after a single passage through the heated tube. The acetic acid which is separated contains non-converted diesters of the butylene glycol as well as a portion of an unsaturated ester which is formed from the diester when only one molecule of acetic acid is split off therefrom. These esters which are contained in the acetic acid can be subjected to decomposition without isolation or after they have been isolated. They are equivalent to the starting ester. The yield of isolated butadiene is given in the table, taking into consideration the amount of these esters still contained in the acetic acid, and is calculated with reference to completely decomposed diester after a single passage through the tube. The yield and conversion are given with reference to pure butadiene. The grade of esterification in the table is the quantity of combined acetic acid in the product given in per cent of the theoretical quantity of combined acetic acid which would be present in the completely esterified diester. The difference between the grade of esterification and 100 hereafter shows the per cent of the free glycol-hydroxyl groups still present. The purity shows how much of the butadiene is present in the condensate produced at −80° C. from the reaction mixture after it has been made free from ester and acetic acid.

TABLE 1

*Mixtures of 1,3-butylene glycol diacetate-monoacetate*

| Grade of esterification | Content of monoacetate | Conversion | Yield of butadiene | Purity of the butadiene |
| --- | --- | --- | --- | --- |
| Percent | Percent | Percent | Percent | Percent |
| 100.0 | 0 | 90.0 | 95.8 | 99.6 |
| 99.4 | 1.8 | 87.2 | 95.2 | 99.3 |
| 99.05 | 2.8 | 85.9 | 93.8 | 98.4 |
| 98.75 | 3.7 | 86.7 | 92.9 | 99.2 |
| 98.3 | 5.0 | 84.6 | 91.9 | 97.6 |
| 97.5 | 7.3 | 80.1 | 88.5 | 95.2 |
| 95.0 | 14.7 | 73.7 | 82.2 | 93.8 |

In these experiments, except the first one, the esterification of the glycols was not completely executed, whereby a mixture of butylene glycol diacetate with monoacetate was obtained. Mixtures of butylene glycol diacetate with free butylene glycol or mixtures of butylene glycol diacetate with monoacetate and free glycol react in the same manner as do mixtures of the diacetate and monoacetate. The above definition of the grade of esterification allows a direct comparison of the mixtures independent of the nature of the non-esterified constituent. Consequently, for example, 5% by weight of glycol monoacetate are equivalent to 1.7% by weight of glycol.

Mixtures of 98.8% and 97.5% by weight of butylene glycol diacetate, respectively, with 1.2% and 2.5% by weight of butylene glycol showed the following values:

TABLE 2

*Mixtures of butylene glycol diacetate-butylene glycol*

| Grade of esterification | Conversion | Yield of butadiene | Purity of the butadiene |
| --- | --- | --- | --- |
| Percent | Percent | Percent | Percent |
| 98.8 | 87.6 | 94.5 | 99.1 |
| 97.5 | 82.4 | 89.5 | 98.2 |

A further mixture contained: 95.2% of butylene glycol diacetate, 3.8% of butylene glycol monoacetate, 1.0% of butylene glycol. The value obtained can be seen in the following table:

TABLE 3

*Mixture of butylene glycol diacetate-monoacetate-butylene glycol*

| Grade of esterification | Conversion | Yield of butadiene | Purity of the butadiene |
| --- | --- | --- | --- |
| Percent | Percent | Percent | Percent |
| 97.7 | 84.7 | 89.5 | 97.3 |

The values specified in the tables are found by short comparative experiments. If the duration of the experiments is prolonged, the conversion is kept rather constant. The yields, however, are somewhat increased because the losses of butadiene caused by the isolation are less important. The purity of the butadiene is also increased. If pure butylene glycol diacetate is employed, a yield of nearly 100% of the diacetate converted is obtained. If employing partly esterified butylene glycol diacetate, the yield is reduced in accordance with the experiments of the above tables, but it is still considerably above the values given in the tables.

The use of a rate of passage of 4000 g. per liter of reaction space per hour in the experiments of the examples is not intended as a limit of the working capacity of the process. It is possible to increase the rate of passage and therewith the working capacity of a given unit of apparatus. The working capacity depends to a considerable extent upon the apparatus employed because the endothermic reaction of decomposition requires a considerable addition of heat.

EXAMPLE 4

The comparative experiments of the decomposition of the 1,4-butylene glycol of various grades of esterification are executed in the same way as Example 3.

Table 4 shows the results of the experiments obtained with mixtures of the 1,4-butylene glycol diacetate and monoacetate in three series of experiments. A reaction vessel of a content of 250 ccm. was employed. The working capacity of this reaction space can be increased still further by increased passage with a suitable addition of heat.

Mixtures of diacetate-monoacetate are produced if the esterification of the 1,4-butylene glycol is extensively, but not quite completely, executed. This esterification can be carried out in the same way as that of the 1,3-butylene glycol by treating the glycol with acetic acid without employing catalysts of esterification.

TABLE 4

*Mixtures of 1,4-butylene glycol diacetate-monoacetate*

| Grade of esterification | Content of monoacetate | Passage | Degree of temperature | Conversion | Yield | Purity |
| --- | --- | --- | --- | --- | --- | --- |
| Percent | Percent | g./liter | | Percent | Percent | Percent |
| 100.0 | 0 | 4,400 | 625 | 92.3 | 98.0 | 99.6 |
| 99.6 | 1.2 | 4,000 | 625 | 90.0 | 96.6 | 97.9 |
| 99.15 | 2.5 | 4,000 | 625 | 89.0 | 95.9 | 97.3 |
| 99.15 | 2.5 | 4,400 | 625 | 89.4 | 95.6 | 96.5 |
| 98.3 | 5.0 | 4,000 | 625 | 87.1 | 93.8 | 96.5 |
| 97.3 | 7.9 | 4,000 | 625 | 81.0 | 87.3 | 90.9 |
| 100.0 | 0 | 4,000 | 600 | 85.0 | 99.8 | 99.4 |
| 99.6 | 1.2 | 4,800 | 600 | 84.3 | 99.1 | 99.0 |
| 97.5 | 7.3 | 4,800 | 600 | 77.4 | 90.1 | 92.6 |
| 95.6 | 12.9 | 4,800 | 600 | 68.7 | 83.3 | 85.6 |
| 99.15 | 2.5 | 4,800 | 600 | 81.3 | 98.4 | 98.4 |
| 99.15 | 2.5 | 4,400 | 610 | 87.2 | 96.1 | 97.4 |
| 99.15 | 2.5 | 4,800 | 610 | 84.0 | 93.9 | 96.0 |
| 99.15 | 2.5 | 4,400 | 620 | 88.4 | 94.7 | 96.4 |

Also here, the result of the decomposition is not essentially dependent upon the nature of the non-esterified constituents. The presence of the 1,4-butylene glycol acts in the same way as the presence of the monoacetate.

In Table 5 the result of the decomposition of a mixture of 1,4-butylene glycol diacetate and butylene glycol is shown. Table 6 gives the results of the decomposition of a mixture of 1,4-butylene glycol diacetate, monoacetate and of 1,4-butylene glycol.

TABLE 5

| Grade of esterification | Content of butylene glycol | Passage | Degree of temperature | Conversion | Yield | Purity |
| --- | --- | --- | --- | --- | --- | --- |
| Percent | Percent | g./liter | | Percent | Percent | Percent |
| 99.5 | 0.5 | 4800 | 600 | 84.2 | 94.8 | 99.2 |

TABLE 6

98.2% of diester
1.3% of monoester
0.5% of glycol

| Grade of esterification | Passage | Degree of temperature | Conversion | Yield | Purity |
| --- | --- | --- | --- | --- | --- |
| Percent 99.05 | g./liter 4800 | 600 | Percent 84.3 | Percent 97.4 | Percent 98.8 |

The mixtures of esters of the 1,4-butylene glycol, upon thermal decomposition, react very similarly to those of the 1,3-butylene glycol; however, little deviations exist. The pure diesters, nevertheless, scarcely differ one from another. The deviations, however, are so unimportant that the esters of the 1,4-butylene glycol can be treated together with the esters of the 1,3-butylene glycol and also in a mixture with not completely esterified constituents.

What we claim is:

1. A process for the production of butadiene, which comprises heating to a temperature between 550° C. and 650° C. in the vapor phase a diester product of a monocarboxylic acid and a butylene glycol wherein the carbon atoms bearing the hydroxyl groups are separated by a carbon atom free of hydroxyl groups, said diester product containing at most only such quantities of free butylene glycol and butylene glycol monoester that the free hydroxyl groups introduced into the product thereby are only 0% to 4% of the total quantity of free hydroxyl groups and acylated hydroxyl groups in such product.

2. A process for the production of butadiene, which comprises heating to a temperature between 550° C. and 650° C. in the vapor phase, an esterification reaction mixture obtained in the preparation of a diester product of a mono-carboxylic acid and a butylene glycol wherein the carbon atoms bearing the hydroxyl groups are separated by a carbon atom free of hydroxyl groups, said reaction mixture containing the water formed during the esterification reaction and an excess of the mono-carboxylic acid and containing at most only such quantities of free butylene glycol and butylene glycol mono-ester that the free hydroxyl groups introduced into the reaction mixture thereby are only 0% to 4% of the total quantity of free hydroxyl groups and acylated hydroxyl groups in such reaction mixture.

3. A process for the production of butadiene, which comprises heating to a temperature between 550° C. and 650° C. in the vapor phase a diester product of a monocarboxylic acid and a butylene glycol wherein the carbon atoms bearing the hydroxyl groups are separated by a carbon atom free of hydroxyl groups in admixture with an inert substance gaseous at the temperature of the reaction, said diester product containing at most only such quantities of free butylene glycol and butylene glycol mono-ester that the free hydroxyl groups introduced into the product thereby are only 0% to 4% of the total quantity of free hydroxyl groups and acylated hydroxyl groups in such product.

4. A process for the production of butadiene, which comprises heating to a temperature between about 550° C. and 650° C. in the vapor phase a diester product of a monocarboxylic acid and a butylene glycol wherein the carbon atoms bearing the hydroxyl groups are separated by a carbon atom free of hydroxyl groups, said diester product containing at most only such quantities of free butylene glycol and butylene glycol mono-ester that the free hydroxyl groups introduced into the product thereby are only 0% to 4% of the total quantity of free hydroxyl groups and acylated hydroxyl groups in such product.

5. A process for the production of butadiene, which comprises heating to a temperature between 550° C. and 650° C. in the vapor phase a diester product of a monocarboxylic acid and 1,3-butylene glycol, said diester product containing at most only such quantities of free butylene glycol and butylene glycol mono-ester that the free hydroxyl groups introduced into the product thereby are only 0% to 4% of the total quantity of free hydroxyl groups and acylated hydroxyl groups in such product.

6. A process for the production of butadiene, which comprises heating to a temperature between 550° C. and 650° C. in the vapor phase a diester product of a monocarboxylic acid and 1,4-butylene glycol, said diester product containing at most only such quantities of free butylene glycol and butylene glycol mono-ester that the free hydroxyl groups introduced into the product thereby are only 0% to 4% of the total quantity of free hydroxyl groups and acylated hydroxyl groups in such product.

7. A process for the production of butadiene, which comprises heating to a temperature between 550° C. and 650° C. in the vapor phase a mixture of a diester product of a mono-carboxylic acid and 1,3-butylene glycol and a diester product of a mono-carboxylic acid and 1,4-butylene glycol, said mixture of diester products containing at most only such quantities of free butylene glycol and butylene glycol mono-ester that the free hydroxyl groups introduced into the mixture thereby are only 0% to 4% of the total quantity of free hydroxyl and acylated hydroxyl groups in such mixture of diester products.

8. A process for the production of butadiene, which comprises heating to a temperature between 550° C. and 650° C. in the vapor phase a 1,3-butylene glycol diacetate product containing at most only such quantities of free butylene glycol and butylene glycol mono-acetate that the free hydroxyl groups introduced into the product thereby are only 0% to 4% of the total quantity of free hydroxyl and acylated hydroxyl groups in such product.

9. A process for the production of butadiene, which comprises heating to a temperature between about 550° C. and 650° C. in the vapor phase a 1,3-butylene glycol diacetate product containing at most only such quantities of free butylene glycol and butylene glycol mono-acetate that the free hydroxyl groups introduced into the product thereby are only 0% to 4% of the total quantity of free hydroxyl and acylated hydroxyl groups in such product.

10. A process for the production of butadiene, which comprises heating to a temperature between 550° C. and 650° C. in the vapor phase an esterification reaction mixture obtained in the preparation of 1,3-butylene glycol diacetate, said reaction mixture containing the water formed during the esterification reaction and an excess of the acetic acid employed in the esterification reaction, and containing at most only such quantities of free butylene glycol and butylene glycol mono-acetate that the free hydroxyl groups introduced into such reaction mixture thereby are only 0% to 4% of the total quantity of free hydroxyl groups and acylated hydroxyl groups in such reaction mixture.

11. A process for the production of butadiene, which comprises heating to a temperature between about 550° C. and 650° C. in the vapor phase a 1,3-butylene glycol diacetate product in admixture with an inert substance gaseous at the temperature of the reaction, said diester product containing at most only such quantities of free butylene glycol and butylene glycol mono-acetate that the free hydroxyl groups introduced into the product thereby are only 0% to 4% of the total quantity of free hydroxyl and acylated hydroxyl groups in such product.

12. A process for the production of butadiene, which comprises heating to a temperature between 550° C. and 650° C. in the vapor phase a 1,4-butylene glycol diacetate product containing at most only such quantities of free butylene glycol and butylene glycol mono-acetate that the free hydroxyl groups introduced into the product thereby are only 0% to 4% of the total quantity of free hydroxyl and acylated hydroxyl groups in such product.

13. A process for the production of butadiene, which comprises heating to a temperature between about 550° C. and 650° C. in the vapor phase a 1,4-butylene glycol diacetate product containing at most only such quantities of free butylene glycol and butylene glycol mono-acetate that the free hydroxyl groups introduced into the product thereby are only 0% to 4% of the total quantity of free hydroxyl and acylated hydroxyl groups in such product.

14. A process for the production of butadiene, which comprises heating to a temperature between about 550° C. and 650° C. in the vapor phase an esterification reaction mixture obtained in the preparation of 1,4-butylene glycol diacetate, said reaction mixture containing the water formed during the esterification reaction and an excess of the acetic acid employed in the esterification reaction, and containing at most only such quantities of free butylene glycol and butylene glycol mono-acetate that the free hydroxyl groups introduced into such reaction mixture thereby are only 0% to 4% of the total quantity of free hydroxyl groups and acylated hydroxyl groups in such reaction mixture.

15. A process for the production of butadiene, which comprises heating to a temperature between about 550° C. and 650° C. in the vapor phase a 1,4-butylene glycol diacetate product in admixture with an inert substance gaseous at the temperature of the reaction, said diester product containing at most only such quantities of free butylene glycol and butylene glycol mono-acetate that the free hydroxyl groups introduced into the product thereby are only 0% to 4% of the total quantity of free hydroxyl and acylated hydroxyl groups in such product.

16. Process of making butadiene which comprises passing the vapors of a monocarboxylic acid diester of 1,3-butylene glycol through a heated reaction zone at a temperature of 550–650° C.

HERBERT GUGGEMOS.
ALFRED TREIBS.